United States Patent [19]

Merry

[11] Patent Number: 4,849,753
[45] Date of Patent: Jul. 18, 1989

[54] ELECTRO OPTIC HIGH TEMPERATURE WELL BORE MODULATOR

[75] Inventor: J. Bradford Merry, Annapolis, Md.

[73] Assignee: Chevron Research Company, San Francisco, Calif.

[21] Appl. No.: 262,164

[22] Filed: Oct. 18, 1988

Related U.S. Application Data

[63] Continuation of Ser. No. 8,994, Jan. 30, 1987, abandoned, which is a continuation of Ser. No. 640,906, Aug. 15, 1984, abandoned.

[51] Int. Cl.[4] ............................................. G01V 1/00
[52] U.S. Cl. .................................... 340/854; 350/356
[58] Field of Search ....................... 367/141, 178, 149; 340/853, 854; 350/356, 355, 357

[56] References Cited

U.S. PATENT DOCUMENTS 4,070,621 1/1978 Bassen et al. .................... 350/393
4,208,636 6/1980 German ............................ 372/42
4,229,079 10/1980 Wayne et al. .................... 350/356

FOREIGN PATENT DOCUMENTS 2104752 7/1982 United Kingdom .

Primary Examiner—Deborah L. Kyle
Assistant Examiner—J. Woodrow Eldred
Attorney, Agent, or Firm—S. R. La Paglia; E. J. Keeling

[57] ABSTRACT

A single-crystal electro-optic modulator is described which positions a cubic temperature-stable bulk single crystal between two polarization plates rotated 90° with respect to each other which are located between lensing means which focus divergent radiation emitted from an optical fiber into parallel rays for passage through the polarization means and the crystal and refocus the parallel rays a focal point and within the angle of acceptance of a return optical fiber.

16 Claims, 1 Drawing Sheet

ELECTRO OPTIC HIGH TEMPERATURE WELL BORE MODULATOR

This application is a continuation of application No. 8,994, filed Jan. 30, 1987 now abandoned which is a continuation of application Ser. No. 640,906, filed Aug. 15, 1984 now abandoned.

FIELD OF THE INVENTION

This application relates to electro-optic modulators. More specifically, this invention relates to electro-optic modulators for use in high temperature environments such as downhole in a hydrocarbon or geothermal well bore.

BACKGROUND OF THE INVENTION

In recent years, there has been a great expansion in the research, development and actual employment of highly sophisticated well logging systems and well logging tools. These systems and tools strain the data carrying capacity of conventional cables. Optical well logging cables have been developed to satisfy the needs for larger data carrying capacity for these more sophisticated well logging systems. In addition, the advancement of geothermal exploration and very deep oil and/or gas wells has forced a need for systems and tools capable of withstanding higher temperatures.

The data from conventional logging systems is in the form of electrical pulses. LED's or lasers are commonly used to convert the electrical pulses into light pulses which are transmitted through the optical fiber. However, these light sources are generally not suitable for use at temperatures greater than about 200° C.

U. S. patent application Ser. No. 285,146, now abandoned filed July 20, 1981 and completely incorporated herein by reference, overcomes this problem by injecting the light into the fiber at the surface and using downhole modulators to modulate either the amplitude or the phase of the light in accordance with electrical signals received from the well logging tool. This system requires four crystals for amplitude modulation. Maintaining the alignment is extremely difficult during the insertion into and extraction from a well bore which penetrates either a geothermal formation or a high-temperature hydrocarbon containing formation. In addition, it is also extremely difficult to obtain four uniform of equivalent thermal coefficients of expansion, doping parameters and purity. Any variation of these parameters will result in the loss of signals or non-uniform signal modulations and variations.

R. K. Swanson et al in "Feasibility Investigation and Design Study of Optical Well Logging Methods for High-Temperature Geothermal Wells" propose the use of an electro-optic waveguide modulator using thin film lithium tantalate, $LiTaO_3$, crystal. Although feasible, this waveguide configuration is only suitable for single mode optical fiber operation. As the length of the optical fiber over which the signal has to traverse is increased, the coupling efficiencies out of and into the single mode fibers place unrealistic power requirements on the LED's or the lasers necessary to transmit the signal down the optical fiber through the electro-optic modulator and back through the optical fiber to the surface. These thin film modulators increase the power requirements of the system on the order of a 100 times. This requirement exceeds the power budget of any system for practical applications. Furthermore, these thin film single mode crystal modulators are extremely inefficient in that most of the light in the single mode optical fiber is lost because the coupling efficiency into the waveguide is on the order of only about 1%. This is a critical limitation because if the light cannot pass through the crystal, then it cannot be extracted to re-enter a return fiber to be passed back up the well bore.

Thus, it would be desirable to have a high-temperature electro-optic modulator which does not require the careful alignment of four crystals. In addition, it would be desirable to have a high-temperature electro-optic modulator for use down a well bore which does not require more than a single crystal so as to avoid the problems of temperature induced birefringence. It would also be desirable to have an electro-optic modulator which incorporates an electro-optic crystal which increases in performance as the temperature rises and in addition exhibits temperature stability. Furthermore, it would be desirable to have a high-temperature electro-optic modulator which can function with multi-mode optical fibers. Additionally, it would be desirable to have a modulator which can cause the amplitude modulation of a light signal upon passing through only a single electro-optic crystal.

SUMMARY OF THE INVENTION

My single-crystal electro-optic modulator has the desirable features recited above and further advantages and objects which are apparent to the ordinary skilled artisan. The modulator can function in any high-temperature environment and most especially in a cable connector spaced between the downhole end of an armored optical fiber logging cable and a conventional or optical well logging tool. A preferred location for the modulator is in the hermetically sealed electronics cavity of a cable connector assembly such as the connector described in U.S. application Ser. No. 623,855 filed June 22, 1984, entitled "Cable Connector Assembly", now U.S. Pat. No. 4,721,355, and completely incorporated herein for all purposes.

The amplitude of a carrier light signal injected into an optical fiber from the surface is modulated by the modulator in proportion to the data measured by the well logging tool and returned to the surface. The single-crystal electro-optic modulator comprises means for focusing light emitted from the downhole end of an optical fiber into parallel rays for passage through a means for polarizing the light which is located in the path of said parallel rays prior to the parallel light rays entry into a bulk temperature-stable cubic structured single crystal. The crystal is positioned so that opposed faces of the crystal are perpendicular to the path of said polarized light and opposite opposed faces have electrodes attached thereto. The electrodes are capable of causing the amplitude modulation of said parallel rays entering a first perpendicular surface of said crystal in response to the measurements of the well logging tool. The modulator also includes a second means for polarization in the optical path of said parallel rays emitted from said crystal and means for focusing said parallel rays emitted from said second means for polarization to a focal point. A return optical fiber is located at the focal point oriented so as to permit said focused rays to be within the angle of acceptance of said return optical fiber.

In the process of modulating the signal, the modulator is attached to the end of an optical fiber cable which is to be subjected to high temperatures such as those encountered in the well bore of a geothermal or hydrocarbon well. The modulator is contained in any standard, hermetically sealed canister. Preferred hermetically sealed enclosures are described in U.S. application Ser. Nos. 285,146 and 623,855. Thereafter, a standard or optical well logging tool is mated to the opposite end of the connector connected to the optical fiber cable. Unless the well logging tool contains its own power source, the optical fiber cable must also contain a suitable number of electrical conductors to provide power downhole to operate the logging tool. A suitable tool would be one that performs neutron logging, nuclear magnetic logging, resistivity logging and the like.

As the tool is inserted into the well bore and travels downhole, measurements are taken and these are encoded into electrical signals. Light is injected into the transmission end of the optical fiber with a suitable light source LED or laser light source, and the like. The light leaves the fiber in the hermetically sealed electronics cavity and is focused by a suitable collimating lens into a source of parallel rays which passes through a polarizer and into the crystal and thereafter through a second polarization filter and is refocused by a suitable collimating lens into a return optical fiber to transmit the light back to the surface. The electrical signals from the tools are directed to the electrodes on the crystal so that the signals modulate a voltage across the crystal to modulate the amplitude of the light passing through the crystal so as to encode the electrical signals into optical signals. The second polarization means permits varying amounts of light to pass therethrough and back to the surface through a return fiber. Standard optical/electrical receiver means at the surface interpret the signal as a binary digital signal. Of course, analogue means can be used if desired. Alternatively, for lower temperature applications, the light source can be downhole and powered by a suitable power source.

Although the high-temperature modulator has been described with respect to its operation in a well bore, it is equally suitable to any high-temperature environment.

BRIEF DESCRIPTION OF THE DRAWING

The FIGURE illustrates a partial cross-sectional view of a bulk single-crystal electro-optic modulator of the invention.

DETAILED DESCRIPTION OF THE INVENTION

Figure 1:
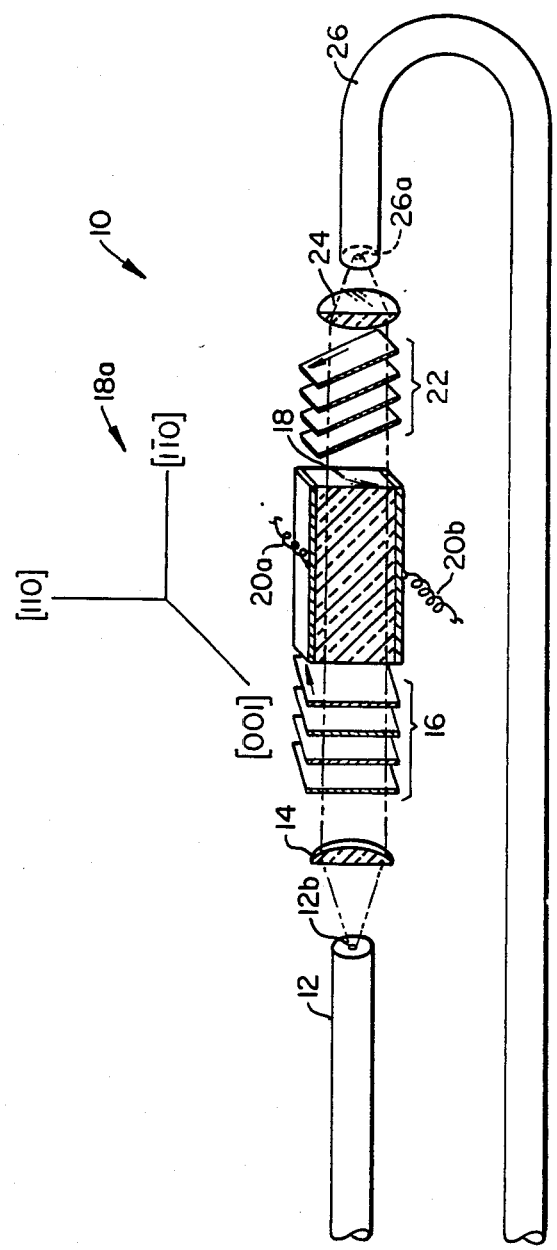

The invention will be more clearly illustrated by referring to the Figure. A single-crystal electro-optic modulator 10 is illustrated in the Figure. The modulator 10 is positioned within the optical path of light from a transmission optical fiber 12 into which light of an appropriate wavelength is injected and a return optical fiber 26. Alternatively, the optical fiber 26 can be spliced into optical fiber 12 so that only one optical fiber in the cable is required. Although the dimensions can be configured for any optical fiber size, the modulator 10 will be described with respect to an optical fiber having a core size of from about 25 to about 50 $\mu$m and a numerical aperture of about 0.2 with a half angle of divergence out of the emitting end 12b of the optical fiber 12 of about 11.5°. The modulator 10 is preferably on the order of about 60 mm from the emitting end of 12b to the return fiber 26a so that a plurality of the devices can fit within a downhole electronics cavity. Preferably, beam divergence within the modulator is about 1.25 milliradians.

Preferably the light source is an LED or laser emitting light in the infrared region having a wavelength of from about 0.80 $\mu$m to about 1.5 $\mu$m and most preferably about 1.3 $\mu$m. Suitable light sources emitting light in this range are gallium arsenide lasers. The light is injected into the uphole end 12a, not shown, and signal travels through the fiber 12 and exits on the end opposite thereto 12b.

The emitted light passes through a first means 14 for focusing diverging light rays into parallel light rays. Suitable lenses are plano convex, double convex lenses, and the like. A suitable collimating lens is a 5 mm lens which is capable of focusing the light into parallel rays having a beam width of about 2 mm.

The parallel light rays pass through a first polarization means 16 positioned in the optical path of the parallel rays according to brewsters angle. Suitable polarization means are ZnSe crystal plates. The number of the plates is determined by desired attenuation and the purity of the polarized light desired. Four ZnSe crystal plates will provide an efficiency of about 90% polarization. Suitable plates have an index of refraction of about 2.4, an extinction ratio of 10 to 1, a platelet size of about 3 mm by 8 mm and are oriented at a brewsters angle of about 67.4°.

The polarized parallel light rays emitted from the polarization means enter an electro-optic bulk cubic single crystal 18 perpendicular to a face of said material and positioned in the optical path of said parallel rays. A bulk crystal is defined as a crystal with sufficient dimensions that it cannot operate as a single wavelength optical waveguide for the wavelength of light of interest. More specifically, the crystal dimensions which are several orders of magnitude larger along its axis, i.e., x, y, and z, than the wavelength of light of interest. Suitable crystal dimensions are about 2.5 mm $\times$ 2.5 mm $\times$ 30 mm.

Preferred bulk cubic single crystals are electro-optic AB type binary II-VI compound crystals such as CdS, GaAs, ZnTe, and CdTe. The crystal to the [1$\bar{1}$0] axis E is parallel too the [110] axis and the electrodes 20a and 20b are on the opposed parallel (110) faces. Since the crystals are cubic, a crystal orientation of K parallel to [110] or [1$\bar{1}$0] and E parallel to [1$\bar{1}$0] or [110] is deemed to be equivalent for the purposes of this application. The cubic single crystal must be capable of being transversely excited, i.e., electrodes 20A and 20B are placed on opposed parallel (110) faces. Gold is a suitable electrode material. Upon the application of a voltage across the electrodes, the polarization of the light is rotated.

If it is rotated 90°, it will pass unhindered through a second polarization means 22. The second polarization means 22 has a similar configuration and construction to the first polarization means 16 but it is rotated 90° with respect to said first polarization means 16. The arrows on first and second polarization means 16 and 22 illustrate the rotation. If the light is rotated 0°, no light passes through the modulator 10. Therefore, this device is an electro-optic polarization modulator. The polarization variation is changed to amplitude modulation by the second polarization means 22, i.e., a cross-polarizer with said first polarization means. The amount of light that passes through the modulator 10 and back into the return fiber 26 is a function of how much of the light is rotated by the application of a voltage across 20a and 20b. The parallel rays exiting the crystal 18 pass through the second polarization means 22. The parallel rays emitted from the second polarization means are refocused through focusing lens 24 similar to lens 14, and directed to the core 26a of an optical fiber 26 for return to the surface.

Alternatively, the first and second polarization means can be configured with the electrodes so that if the light is rotated 90° no light passes through the modulator 10 and if the light is rotated 0° all the light passes.

Of the crystals described, a cadmium telluride single crystal CdTe is most preferred. CdTe does not exhibit a temperature induced birefringence, due to the cubic configuration of the crystal lattice. Therefore, the temperature may be allowed to drift from 10° C. to 250° C. without control so long as there are no temperature variations across the crystal itself. The crystal can function at temperatures of up to about 250° C. In view of the small size of the crystal required and the overall temperature of the surrounding well bore environment, a uniform temperature is achieved quickly across the crystal. In addition, a CdTe crystal with dimensions of 2.5 mm×2.5 mm×30 mm has a capacitance of only 2.0 pf and requires electrodes capable of applying a bias voltage of 60 V with a peak-modulating voltage of ±60 V. The RF bandwidth is about 30 MHz and the nominal modulator circuit power consumption of is only about 0.8 watts. Furthermore, CdTe is opaque to light of less than about 1.2 μm and transparent at wavelengths >1.2 μm. This makes working with the crystal easier. Suitable crystals are available from the Two-Six Corporation, Saxonburg, Pa.

In a preferred operation, the single-crystal electro-optic modulator is placed on the downhole end of an armored optical fiber capable of transmitting power and optical signals down a well bore to a logging tool. The electrical signals from the tool are used to modulate the light passing through the crystal by the application of a voltage across electrodes 20a and 20b. The use of this single-crystal system causes fewer alignment problems than four-crystal systems and does not require careful temperature control other than to insure no temperature gradients across the crystal itself.

In one embodiment, the modulator further incorporates a means to maintain the temperature of the crystals (27) to within ±4° C. of their maximum operating temperature regardless of the temperature of the surrounding environment. The modulator can further incorporate a means for modulating an electrical voltage (28) applied across the electrode means, wherein the modulation is capable of imparting a polarization modulation to the parallel rays. A plurality of modulators can be fitted within the electronics cavity of a cable connector and between an armored optical well logging cable and a well logging tool.

The invention has been described with respect to particularly preferred embodiments and modifications which would be obvious to one of ordinary skill in the art are contemplated to be within the scope of the invention. For example, the modulator is suitable for use in any high-temperature environment. In addition, it can be configured to pass all the injected light with no voltage applied across the electrodes or all the injected light with no voltage applied across the electrodes.

What is claimed is:

1. A high-temperature, electro-optic modulator suitable for use in a hermetically sealed armored optical well logging cable connector electronics cavity, said modulator consisting essentially of:

an optical fiber;
a first focusing means in the optical path of an optical light signal emitted from the end of the optical fiber, said first focusing means capable of focusing the diverging rays of said light signal emitted from said end of said optical fiber into parallel rays;
a first polarization means oriented by brewsters angle in the optical path of said parallel rays emitted from said first focusing means;
a temperature-stable, electro-optic bulk AB type binary cubic lattice structured single-crystal in the optical path of said parallel rays emitted from said first polarization means, said crystal oriented with said parallel rays propagating K parallel to the (110) axis, and said crystal having opposite opposed parallel faces;
electrodes contacting said opposite opposed parallel (110) faces;
a second polarization means oriented by brewsters angle in the optical path of said parallel rays emitted from said crystal, said second polarization means rotated 90° with respect to said first polarization means; and
a second focusing means in the optical path of said parallel rays and capable of focusing said parallel rays emitted from said second polarization means into a focal point.

2. The modulator according to claim 1 wherein said single crystal is selected from the group consisting of CdS, GaAs, ZnTe, and CdTe crystals.

3. The modulator according to claim 2 wherein said first and second polarization means are four ZnSe plates.

4. The modulator according to claim 3 wherein said modulator is operated in an environment having a temperature in the range of from about 10° C. to about 250° C.

5. The modulator according to claim 4 wherein said ZnSe plates are oriented at a brewsters angle of about 67.4° and set to have an efficiency of about 90% for polarization of said parallel light rays.

6. The modulator according to claim 5 further including an emiting optical fiber and a return optical fiber having a core diameter of from about 25 μm to about 50 μm with a numerical aperture of about n.2, and said return optical fiber is positioned at the focal point of said second focusing means and within the angle of acceptance of said optical fiber.

7. The modulator according to claim 6 wherein said first focusing means is positioned such that the half angle of said optical light signal emitted from said emitting optical fiber is about 11.5° and said optical light signal is collimated into parallel rays having a width of about 2 mm.

8. The modulator according to claim 7 wherein said modulator is operated in a well bore environment having a temperature range of from about 100° C. to about 250° C., and said optical light signal has a wavelength of from about 0.8 μm to abou 1.5 μm.

9. The modulator according to claim 8 wherein said crystal is a CdTe crystal oriented with K parallel to the axis and E parallel to the axis and said electrodes are on parallel (110) faces.

10. The modulator according to claim 9 further incorporating means to maintain the temperature of said crystal to within ±4° C. of their maximum operating temperature regardless of the temperature of the surrounding environment.

11. The modulator according to claim 10 further incorporating a means for modulating an electrical voltage applied across said electrode means, said modulation capable of imparting an amplitude modulation to said parallel rays.

12. The modulator according to claim 11 wherein said optical light signal has a wavelength of about 1.3 μm.

13. The modulator according to claim 12 wherein said modulating means can apply a bias voltage of about 60 volts with a peak-modulating voltage for a 50% modulation of about ±60 volts, has an RF bandwidth of about 30 MHz and a power consumption of about 0.8 watts.

14. The modulator according to claim 13 wherein said optical light signal injected into said emitting optical fiber is a continuous light signal.

15. A high-temperature, electro-optic well logging modulator consisting essentially of:
- an optical fiber for transmitting an optical light signal, said optical fiber having a fiber core size of from about 25 μm to about 50 μm and a numerical aperture of about 0.2 with an injection end for injecting an optical light signal having a wavelength of from about 0.8 microns to about 1.5 microns therein and an emitting end;
- a first collimating lens for focusing said optical light signal emitted from said emitting end into parallel rays, said lens having a focal length of about 5 mm and configured so as to focus light emitted with a divergence of about 11.5° into parallel rays having a beam width of about 2 mm;
- a first set of four ZnSe polarization plates oriented by a brewsters angle of about 67.4° in the path of said parallel rays emitted from said collimating lens;
- a bulk crystal of CdTe oriented with light propagating K parallel to the axis and the electrodes applied to the (110) faces;
- a means for modulating a voltage applied across said electrodes on said crystal in response to an induced electrical signal corresponding in magitude to measurements taken from a surrounding geological formation, said means capable of modulating the amplitude of said parallel rays;
- a second set of four ZnSe polarization plates oriented at a brewsters angle of about 67.4° but rotated 90° with respect to said first four ZnSe polarization plates and in the path of said parallel rays emitted from said second crystal;
- a second collimating lens for focusing said parallel rays emitted from second set of four ZnSe polarization plates into a focal point; and
- a return optical fiber at the focal point of said second collimating lens and positioned within the angle of acceptance of said optical fiber, said optical fiber having a core diameter of from about 25 μm to about 50 μm.

16. A process of transmitting signals from a well logging tool along an optical cable consisting essentially of:
- injecting a continuous light signal into an optical fiber and down a well bore;
- extracting said optical signal from said optical fiber in an electronics cavity situated in a cable connector between said optical cable and a well logging tool;
- passing said optical signal through a first collimating lens, a polarization means, a bulk CdTe single crystal, a second polarization means, a second collimating lens, and into a return optical fiber; and
- modulating said optical signals passing through said CdTe crystal through the application of a voltage across said crystal, said modulating is in response to electrical signals from said well logging tool.

* * * * *